May 16, 1950 H. W. HOLMSTROM 2,508,066
BUILDING CONSTRUCTION
Filed July 3, 1947 2 Sheets-Sheet 1
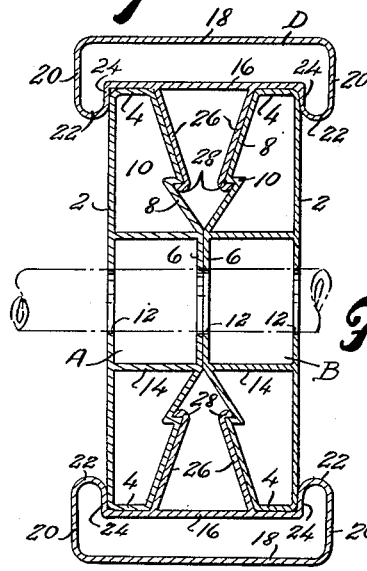
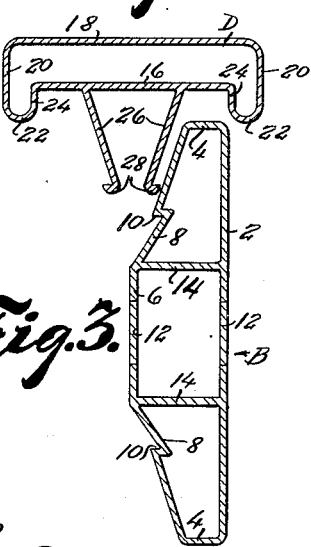
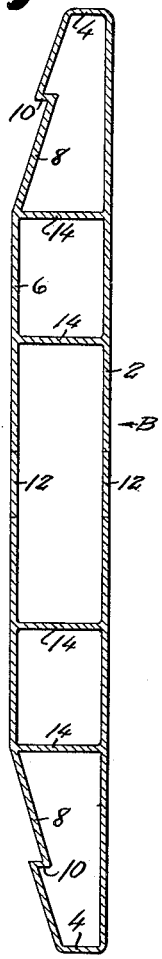
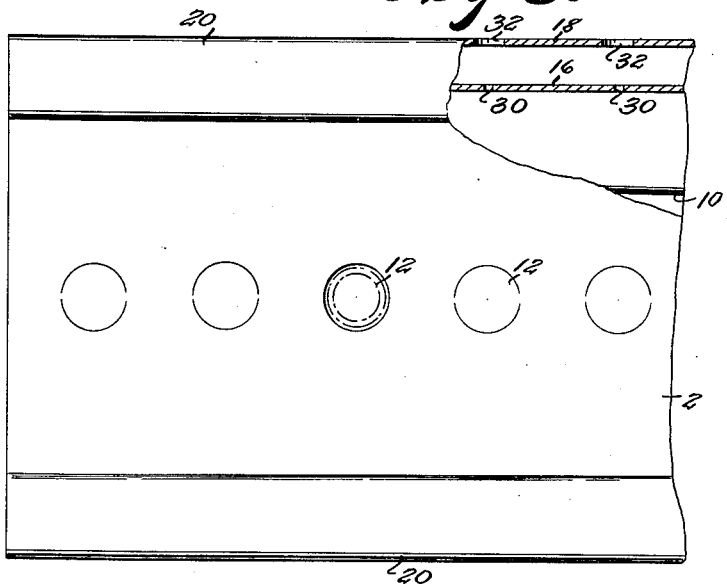
INVENTOR.
Henry W. Holmstrom
BY Victor J. Evans & Co.
ATTORNEYS May 16, 1950 H. W. HOLMSTROM 2,508,066
BUILDING CONSTRUCTION
Filed July 3, 1947 2 Sheets-Sheet 2
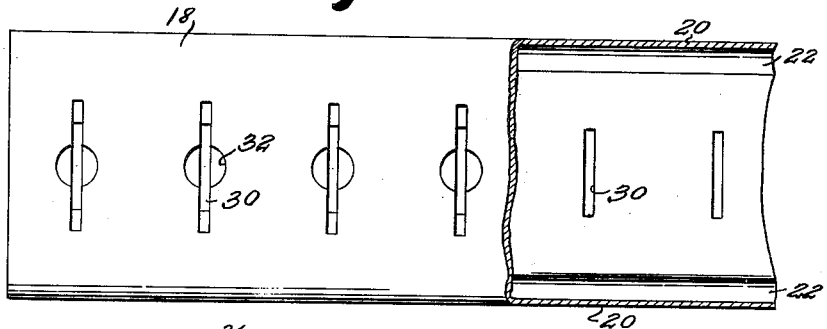
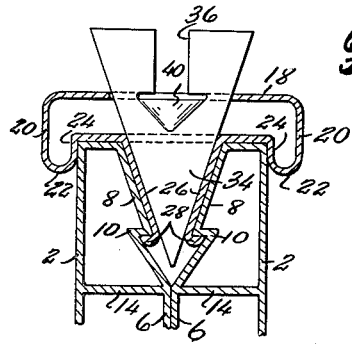
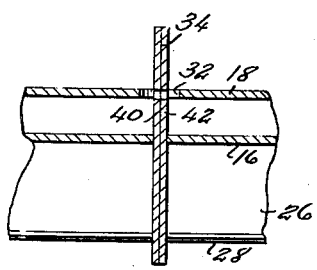
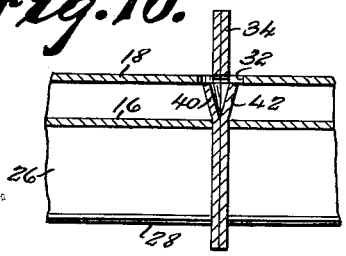
INVENTOR.
Henry W. Holmstrom
BY Victor J. Evans & Co.
ATTORNEYS Patented May 16, 1950

2,508,066

UNITED STATES PATENT OFFICE 2,508,066

BUILDING CONSTRUCTION

Henry W. Holmstrom, Richmond Highlands, Wash., assignor of one-third to John A. Isaacson, Richmond Highlands, Wash., and one-third to Robert A. Joss, Seattle, Wash.

Application July 3, 1947, Serial No. 758,922

1 Claim. (Cl. 189—34)

My present invention relates to an improved building construction and more especially to a pressed steel structural framing and the method of joining the same.

The framing of my invention includes preformed elements which are assembled at the job and which present improvements on my Patent #2,154,570. In the present disclosure I have simplified and strengthened the framing elements and increased the speed of assembly and decreased the time.

In the accompanying drawings I have illustrated one complete example of the physical embodiment of my invention according to the best mode I have thus far devised, but it will be understood that various changes and alterations may be made in the exemplified structure within the scope of the appended claim.

In the drawings:

Fig. 1 is a vertical sectional view through an assembled girder.

Figs. 2 and 3 are similar views with the parts disassembled.

Fig. 4 is an enlarged view of a modified form.

Fig. 5 is a front elevational view of the girder of Fig. 1.

Fig. 6 is a top plan view of the girder.

Figure 7 is a perspective view of the wedge.

Figure 8 is a sectional detail view showing the wedge securing device in position.

Fig. 9 is a transverse sectional view of the wedge in position ready for clamping.

Fig. 10 is a similar view with the wedge clamped.

Referring now to the drawings, I have illustrated the present preferred embodiment of my invention as comprising the hollow body sections A and B which are arranged in superposed relation and each has a flat outer wall 2 with end walls 4, and abutting faces 6. The angular or diverging faces 8 connecting the end walls and the abutting faces are offset at 10 to form engaging ribs for the top and bottom end sections C and D.

The walls 2 and the abutting faces 6 are provided with aligned knock-out disks 12 which, when removed, define aligned openings that are adapted to receive piping, electric conduits and the like, and braces or struts 14 insure the maintenance of the preformed shape of the sections. As seen in Fig. 4, the sections may be elongated and formed with additional braces.

The sections C and D are also of hollow sheet metal construction with parallel walls 16 and 18 connected by end walls 20 which have extensions 22 curving back at 24 to the opposite wall. As seen in the drawings these extensions in assembly overlap the sections A and B, and latching means including projecting plates 26 have hooked edges 28 engaging the ribs 10 of the sections A and B. Thus, when assembled the four sections A, B, C and D form a rectangular girder of light weight and great strength.

However to lock the assembly I provide in the walls 16 and 18 the aligned slots 30 and the slots in the outer wall 18 have circular central openings 32.

A triangular wedge 34 of double thicknesses is made of a pair of superimposed sheets of sheet metal suitably secured to each other and has a vertical opening 36 communicating with a lateral opening or slot 38, the two forming an inverted T-slot. The wedge is inserted in the slot of the outer wall and driven home as in Fig. 9 and then with a suitable tool inserted in the slot 36 the portions 40 and 42 of the wedge immediately under the slot 38 are expanded laterally until they are spread a distance greater than the radius of the circular opening 32. Thus the four sections are assembled in locked relation forming a substantial structure.

While I have referred to the assembly as being a girder, it will be understood that the assembly may be used in various capacities in building construction and will be simple to assemble and yet will, when assembled, effect a strong rigid frame.

Having thus fully described my invention, what I claim as new and desire to secure by Letters Patent is:

In a building construction, a pair of hollow body sections arranged in superposed relation, said body sections having abutting faces and diverging faces, a plurality of spaced, parallel struts extending between the faces of said body sections and secured thereto, the diverging faces having an offset portion, a pair of hollow end sections each provided with spaced, parallel extensions on their ends preventing displacement of the body sections, said end sections including an inner and outer wall arranged in spaced, parallel relation with respect to each other, there being a plurality of aligned slots in the inner and outer walls of the end sections, the slots in the outer wall each having an enlarged circular opening position at the center of the slot and communicating therewith, a pair of converging plates projecting from the inner wall of each end section, hooked edges arranged on the ends of said plates and in engagement with the offset portions of said diverging faces, wedges positioned in the aligned slots for urging the plates against the diverging faces, said wedges each including a pair of triangular sheets arranged in superposed relation, said wedges being provided with openings having an inverted T-shape, the portions of the sheets contiguous to the last-named openings being expanded to engage the inner surface of the outer wall and having a larger diameter than the enlarged circular openings in the outer wall so that the sections will be maintained in assembled relation.

HENRY W. HOLMSTROM.

REFERENCES CITED

The following references are of record in the file of this patent:

UNITED STATES PATENTS

| Number | Name | Date |
|---|---|---|
| 2,154,570 | Holmstrom | Apr. 18, 1939 |